March 16, 1954

M. E. BARBER 2,672,149

MACHINE FOR WASHING AND RINSING GLASS
METER COVERS AND THE LIKE

Filed Jan. 16, 1950

MERLIN E. BARBER
INVENTOR.

BY

MERLIN E. BARBER
INVENTOR.

March 16, 1954 M. E. BARBER 2,672,149
MACHINE FOR WASHING AND RINSING GLASS
METER COVERS AND THE LIKE
Filed Jan. 16, 1950 6 Sheets-Sheet 5
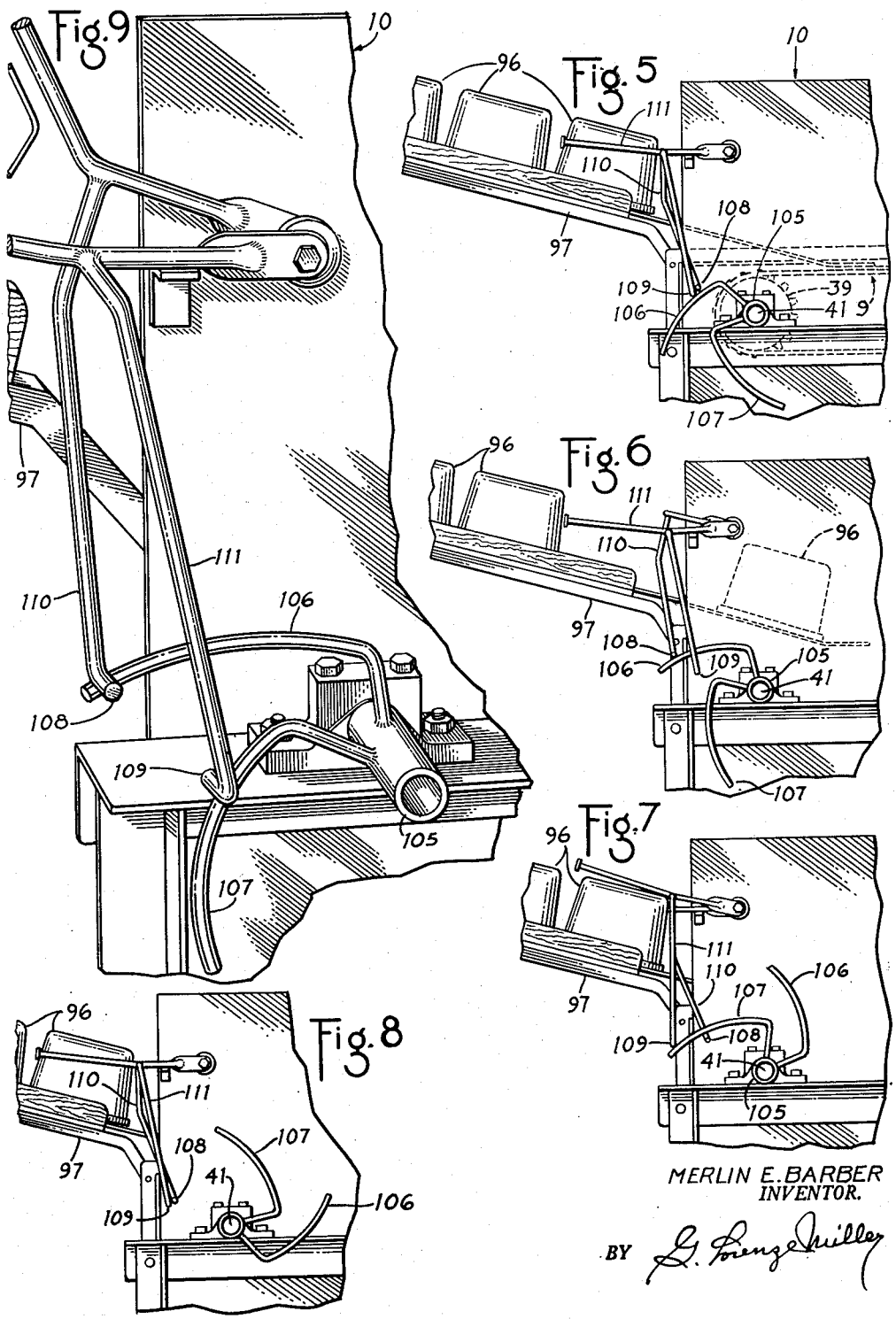
MERLIN E. BARBER
INVENTOR.
BY

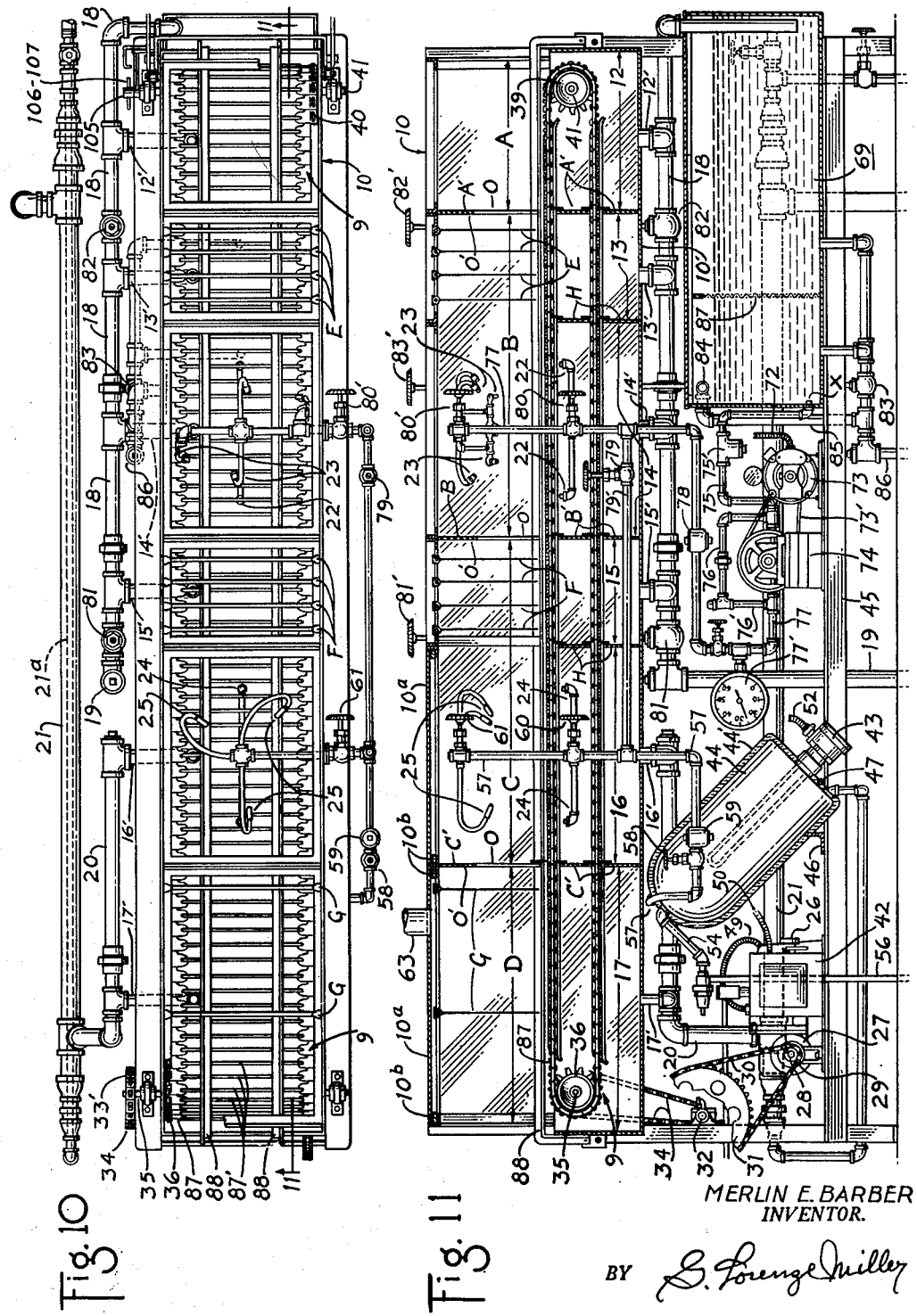

Patented Mar. 16, 1954

2,672,149

UNITED STATES PATENT OFFICE

2,672,149

MACHINE FOR WASHING AND RINSING GLASS METER COVERS AND THE LIKE

Merlin E. Barber, Decatur, Ill.

Application January 16, 1950, Serial No. 138,786

5 Claims. (Cl. 134—57)

The present invention relates to a machine for mass washing and rinsing of special articles. More particularly this invention relates to a machine for washing and rinsing foreign substances from glass covers, such as are used for enclosing electric meters.

Electric meters with a glass cover are often mounted outside and the glass accumulates deposits of dirt from the surrounding atmosphere and other foreign substance. It is important to keep these glass covers reasonably clean and accordingly at intervals these covers are collected to be washed. The average glass meter cover remains on the meter, whether indoors or outdoors, for periods of from 5 years to 10 years, after which the meter is removed from its mounted location, and taken to the laboratory for testing, and at such times the meter covers are given a thorough cleansing. It is obvious that over such long periods of time, much dirt is collected on the cover, some of which adheres almost beyond the possibility of being scraped off by a suitable tool.

Heretofore, the glass meter covers have had to be placed in a "stripping" tank or vat, containing a chemical solution, which may be an "Oakite" stripping solution, to remain and soak therein for periods of from one to three days, according to the amount of dirt deposit on the meter covers. Then after the soaking period, the covers were taken out of the stripper vat singly, and worked over with either a brush or rag, as the individual cover's condition would seem to require. Then the covers are handled again, each singly, to place them in a rinse tank, from which they are later removed and placed on a drain board, and when drained are dried with a suitable cloth in the hands of the operator. The time, labor, and breakage burden embodied in the hand cleansing method above described, is very great and these expensive maintenance factors have resulted in the development of this invention.

An object of the present invention, therefore, is to provide a machine for washing and rinsing articles, such as the above referred to meter covers, thereby eliminating the old slow hand washing process.

Another object is to provide a machine which is continuously automatic in operation from the loading end to the discharge end thereof and serves to treat, rinse and dry as it operates.

Still another object is to provide a machine for treating glass meter covers by loading, spacing and feeding them to chemically treat, rinse and dry the same for complete cleansing.

Many other objects and advantages of the present invention will appear from the following detailed description, which refers to the accompanying drawings by like reference numerals for each like part.

Figures 5 to 9 inclusive are fregmentary views taken at the loading end of the machine showing in particular the means for alternately stopping, starting, and subsequently spacing the covers in their movement into the machine; for example;

Figure 5 shows the first cover in the line of covers on the loading chute being held in stopped position, this position, of course, also holding back all of the other covers on the chute;

Figure 6 shows (in dotted lines) the said first cover (mentioned as in Fig. 5) as having been released from its stopped position and about to contact the conveyor belt which is shown in dotted lines in the Fig. 5, while the mechanism is still holding back the rest of the covers, pending the accomplishment of the correct spacing time.

Figure 7 shows another cover having moved into "first" position, being held therein by a part of the mechanism while another part thereof is about to move down into position between the covers in first and second position, so that all of the covers except that one in first position, are held back by that particular part of the mechanism.

Figure 8 is a view showing the mechanism idle, and the driven shaft on which are mounted the two angularly formed or curved cam fingers, disengaged from contact with the members which stop, start and space the covers on the conveyor at the loading end of the machine.

Figure 9 is a fragmentary perspective view, somewhat enlarged, showing more clearly than the Figs. 5 to 8, the details of the mechanism shown in those views.

Figure 10 is a top plan view of the invention, the flat lids which normally cover the main container and are set into the top thereof, being removed to facilitate showing the details of the mechanism, and without the loading and discharge chutes, and, Figure 11 is a combination sectional and elevational view taken on or about the line 11—11 of the Fig. 10, showing the upper structure in section, the chemical or Oakite tank and the hot water tank in section, and the piping courses, motors, etc. shown in elevation for clearer illustration.

Figure 2:
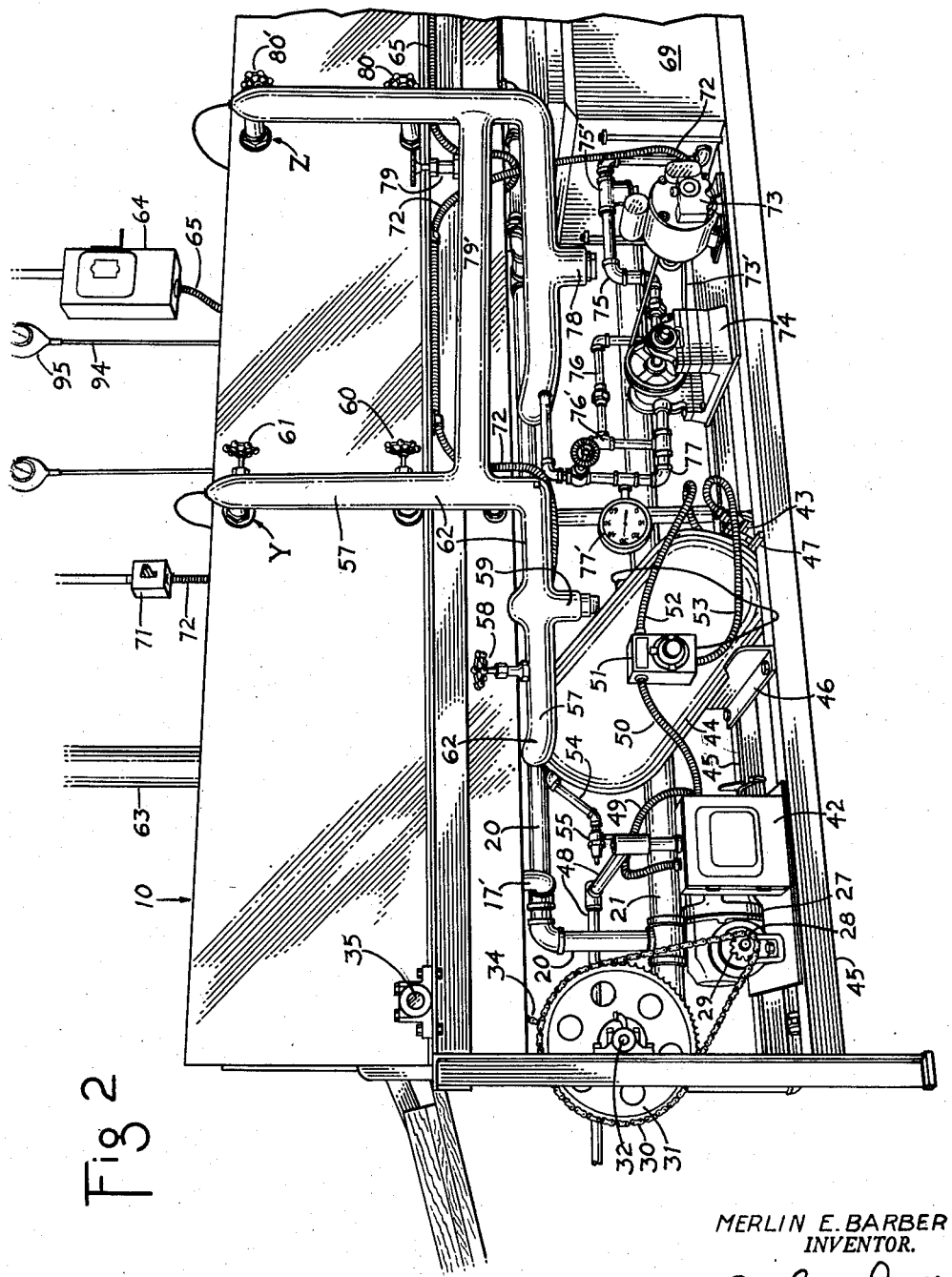
Figure 2 is a perspective view showing the left-hand or discharge end of the machine, the discharge chute being broken away to conserve space.

Figure 12 is a fragmentary view showing partly in section and partly in elevation, the details of the structure at Y and Z in Figure 2, without the insulating covering.

Figure 1:
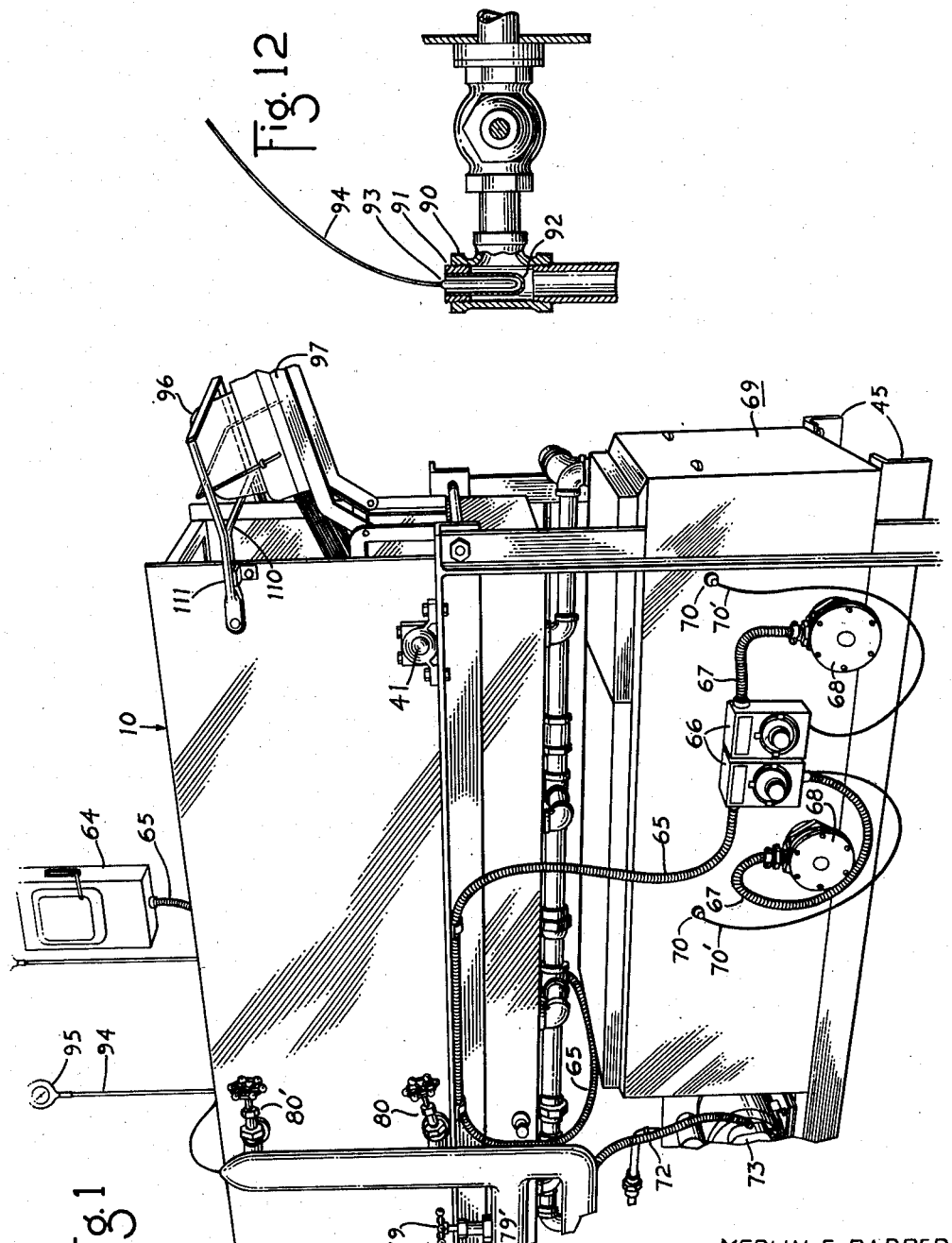
Figure 1 is a perspective view showing the right-hand or loading end of the machine, the loading chute being broken away to conserve space.

Referring in detail to the drawings and first with particular reference to Figures 10 and 11, there is illustrated one form of apparatus for practicing this invention comprising a main cabinet 10, which is elongated from an open loading end, see Fig. 1, to a discharge end, see Fig. 2. The loading end connects with a suitable loading chute and feed control hereinafter described.

The main cabinet 10 houses the conveyor assembly, the spray nozzle assemblies, namely, the chemical spray nozzle assemblies and the hot water spray nozzle assemblies, the cabinet partitions which define the several stations, the rubber curtains, etc. while the other details of the device are arranged exteriorly of the main cabinet 10 or beneath it on the base of the machine.

The cabinet 10 is divided into several stations or smaller units of operation, which, when taken from the loading end of the machine, comprise the loading cabinet A, the chemical treating or Oakite spray cabinet B, the hot water rinse cabinet C, and the drying cabinet D. (See Fig. 11.)

Dividing the cabinets A and B is the partition A'. Dividing the cabinets B and C is the partition B'. And dividing the cabinets C and D is the partition C'. Each of these partitions A', B' and C' has a rectangularly shaped opening O providing access through from one cabinet to the other for the movement of the glass meter covers on the conveyor element 9 when in motion. A slit, multi-piece rubber curtain marked O', shown in Figure 11, covers each of the openings O. A plurality of additional split multi-piece rubber curtains marked E are arranged in spaced apart relation to each other just inside the entrance to the cabinet B. A plurality of the same type of curtains F in the same spaced apart relation are arranged just inside the entrance to the cabinet C, and two of the same type of curtains G are arranged spaced apart from each other within the cabinet D. These curtains O', E, F, and G prevent the hot steam given off by the chemical or Oakite spray cabinet B, the hot water spray cabinet C, and the hot moisture or drier cabinet D from intermixing or getting out into the room containing the machine.

It will be noted that the partitions A', B' and C' extend from the top of the cabinet 10 down to the bottom thereof, and in addition to the opening O are provided with a separation or break where the conveyor element 9 operates. And similarly, it will be noted that two shorter partitions H are provided and extend from the bottom 10' of the cabinet 10, and each also have a separation or break to accommodate the lower course of the conveyor element 9, while the upper edge of said partitions H terminate just beneath the upper course of said conveyor element.

The separate or individual drain tanks 12, 13, 14, 15, 16 and 17 are formed from the arrangement of the bottom 10' of the cabinet 10, the shorter partitions H which extend between the said bottom 10', and the upper portion of the conveyor element 9, together with the lower portion of the partitions A', B', and C' which partitions are also between the said bottom 10' and the upper portion of the conveyor element.

The tank 12 receives simply condensation and Oakite drippings and drains through the pipe 12' into the line 18 and thence back into the chemical tank. The tank 13 receives chemical Oakite solution drippings from the curtains E, and drains through the pipe 13' into the line 18 and back into the chemical or Oakite solution tank. The tank 14 receives Oakite solution spray from the nozzle assemblies 22 and 23 and drains through the pipe 14' into the line 18 and back into the Oakite solution tank. The tank 15 receives Oakite solution drippings from the curtains F and drains through the pipe 15' into the line 18 and back into the Oakite solution tank. The tank 16 receives hot water spray from the spray nozzle assemblies 24 and 25 and drains through the pipe 16' into the line 20 and pipe 21 to sewer or waste. The tank 17 receives condensation and drippings of hot water and drains through the pipe 17' into the line 20 and pipe 21 to sewer or waste.

It will be noted that the cold water is conveyed to the machine or rather to a hot water tank hereinafter described, by a copper tube 21ª shown by dotted lines in Figure 10, centrally disposed in the drain pipe 21, so that as the hot water from the tanks 16 and 17 is drained off, it is cooled by the incoming water through the copper tube before it reaches the sewer. This of course also serves to pre-heat the incoming water.

The lids 10ª are shown for the closure of the top of the cabinet 10 in the upper left-hand portion of the Fig. 11. These lids 10ª are simply a rectangular sheet of heavy metal. They have fastened entirely around their periphery on the under side and even with the edge, a strip of sponge rubber 10ᵇ or similar material, to keep the steam and water and Oakite spray solution within the cabinet at all times.

The motor 26 (see Figs. 3 and 11) and its associated gear reduction unit 27 (see Figs. 2, 3 and 11) actuate the sprocket chain 30 from the drive spur gear 29 on the drive shaft 28 of the gear reduction unit 27. The sprocket chain 30 drives the driven spur gear 31 fixed on a shaft 32, which shaft carries fixedly mounted thereon (see left side of Fig. 3) the driven spur gear 33 engaging a sprocket chain 34, which in turn engages and drives spur gear 33', said gear 33' being keyed on the left-hand end (see Fig. 3) of the driven shaft 35, which also has keyed to it intermediate its ends and in spaced relation from each other a pair of identical spur gears 36 and 37 which in turn drive the conveyor element assembly 9, which engages at the loading end of the machine a pair of idler spur gears 39 and 40 keyed on the idler shaft 41.

The motor 26 is controlled from a switch box 42, and from this same switch box 42 is started and controlled the two immersion type heating elements 43 mounted in the bottom wall of an angularly positioned hot water tank 44. This tank is mounted between two lower frame members 45 of the machine base by means of a laterally placed angle iron 46 and a square rod 47. Electric power is supplied to the motor 26 through the electric conduit 48, through the switch box 42, to the motor 26, see Figure 2, while the flexible electric conduit 49 leads from the switch box 42 to the thermostat control unit 51 and through the flexible conduit 49 to motor 26, see Figure 2. The flexible conduit 50 carries power from the switch box 42 to the thermostat control unit 51, from which the two flexible electric conduits 52 and 53 carry power to the two immersion type heating elements 43 for heating the water in the hot water tank 44.

Out of the top of the hot water tank 44 is an overflow line 54, shown in the Fig. 2, and a safety relief valve 55 having a drain pipe 56 to sewer, in case of excessive heat in the water tank. Also out of the top of the hot water tank 44 is the hot water line 57 having a manual shut-off valve 58 and a filter and drain element 59, said hot water line 57 leading upward to carry hot water to and through the spray nozzle assemblies 24 and 25. These spray nozzles being positioned above and below the upper course of the conveyor 9.

The thermostat control element 51 may be set for any desired temperature for the hot water, and the water may thus be held at any desired temperature throughout the operating period of the machine. The valve 58 may be closed to withhold water from the assemblies 24 and 25 in case of cleaning or repairs, and for cleaning the filter element 59 when necessary. Shut-off valves 60 and 61 are provided in the line 57 just ahead of the hot rinse water spray nozzle assemblies 24 and 25 to provide for maintenance or cleaning, see Figure 2.

As will appear from reference to the Figs. 2, 10 and 11, while the relatively heavy insulation material as at 62 is provided as a covering for the line 57 exteriorly of the machine, the same is omitted in the Figs. 10 and 11 in order to more clearly show the essential parts. Also, the insulation 44' covering the hot water tank 44 enables the water to be heated and kept so for longer periods, while at the same time minimizing the heat radiated off the tank into the room space.

Figure 3:
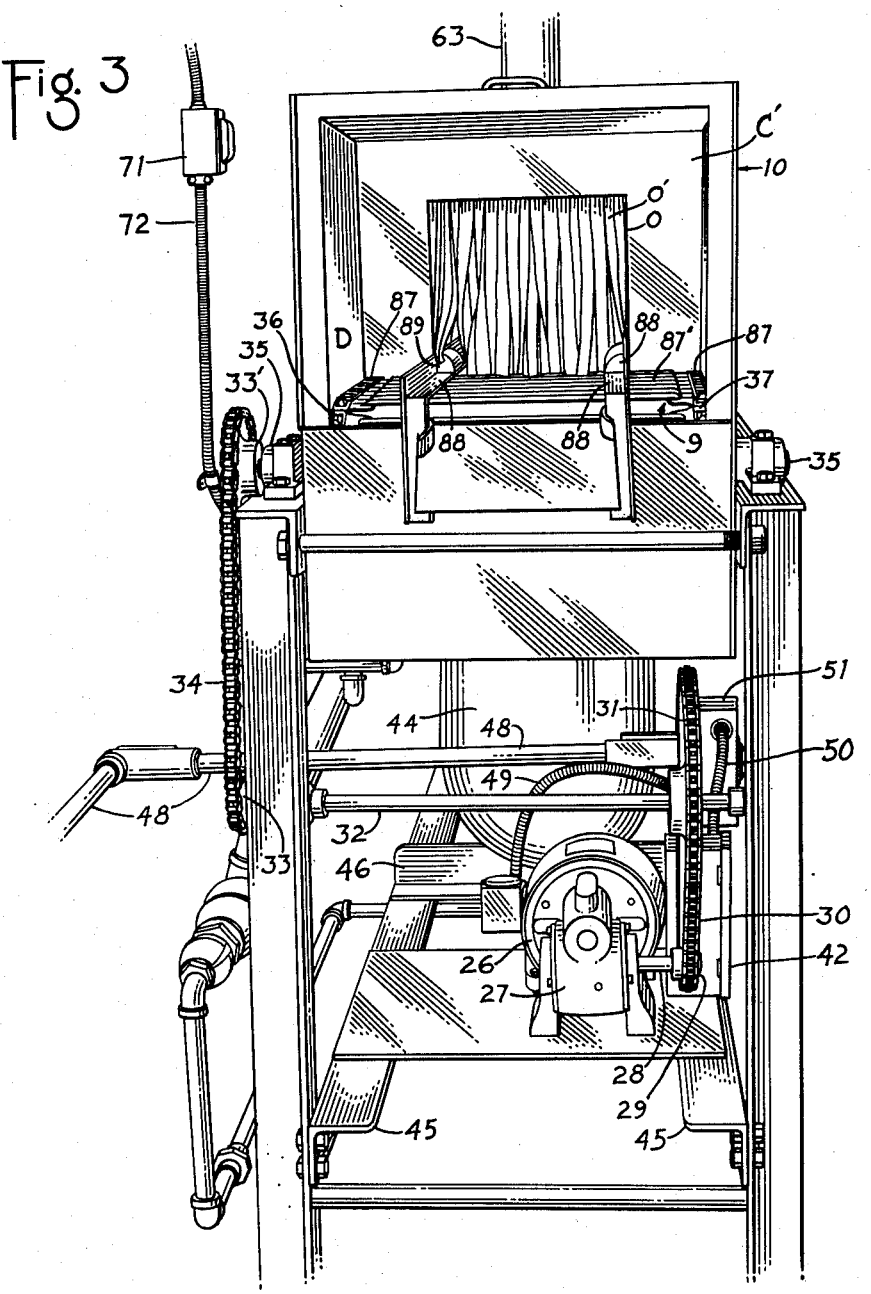
Figure 3 is a perspective view showing the discharge end of the machine, the discharge chute removed so that essential features of the machine may be seen.

In the Figs. 2, 3 and 11, there is shown a vent pipe 63 from the roof of the drying cabinet D. This is adapted to carry off moisture and fumes from the drying cabinet D before the final discharge of the covers onto the discharge chute.

The Oakite or chemical spray mechanism is set in operation by turning on the switch at the switch box 64, see Figures 1 and 2, which conveys power through the flexible electric conduit 65 to the two thermostat control elements 66 from which the electric power is carried through the flexible electric conduits 67 to the two immersion type heating elements 68. These are the same as those numbered 43 and these elements 68 are mounted in fixed position on the side near the bottom of the chemical or Oakite tank 69, so that the elongated U-shaped portion of each of the elements 68 is immersed in the Oakite solution, to thereby heat the same. Two thermometer heat sensitive elements 70 are mounted on the side of the tank 69 adapted for immersion contact in the chemical or Oakite solution, and they are adapted for contact with the said thermostat control elements 66 by means of relatively small wire casements 70'.

When the machine is to be operated, allow approximately 30 minutes for the various elements to build up the required temperatures. Suitable temperature for the hot water is between 160° F. and 190° F., while suitable temperature for the chemical or Oakite solution is between 160° F. and 180° F.

Then turn on the switch 71, shown in Figure 2, which thus carries power through the flexible electric conduit 72 to the motor 73. This motor by its belt 73' operates the Oakite solution pump 74, which pumps Oakite solution from the tank 69 through the line 75 having a filter 75'; thence through the by-pass line 76 having a relief valve 76' and through the line 77 having a pressure gauge 77' and a filter element 78, upward to supply Oakite solution to and through the spray nozzle assemblies 22 and 23 before described positioned below and above the upper course of the endless conveyor 9.

The by-pass line 76 comes into use only in case the pressure on the line 77 is too great, and thus sends the solution back to the entrance to the pump by means of the relief valve 76'.

The shut-off valve 79 in the line 79' may be opened for the purpose of allowing the hot water from the line 57 to flush out the spray nozzle assemblies 22 and 23 when the machine is shut down after a run is made. The shut-off valves 80 and 80' are provided in the line 77 just ahead of the spray nozzle assembly 22 and 23 to provide for maintenance or cleaning.

The shut-off valve 81 in the line 18 having the upwardly extending handle 81' is normally closed, but may be opened for the purpose of draining into the sewer or waste line through the pipe 19 the residue from the separate drain tanks 12, 13, 14 and 15 on occasion.

Now, in the event that it is desired to flush out the spray nozzle assemblies 22 and 23 with hot water from the line 79', the shut-off valve 82 having the upwardly extending handle 82' is closed to keep the hot water from entering the chemical or Oakite solution tank 69, and the shut-off valve 81 is also closed to keep the hot water from running down the pipe 19 into the sewer. Then, the shut-off valve 79 in the line 79' is opened, thus permitting the hot water to enter and flush through the spray nozzle assemblies 22 and 23 for cleansing. When the cleansing operation is completed the valve 81 may be opened to drain the residue into the sewer through the pipe 19, and then it is closed again for normal operation of the machine. The valve 79 is also then closed to exclude the hot water from the Oakite spray elements, and the valve 82 is again opened to permit the Oakite solution to return to the tank 69 in normal operation. The shut-off valve 83 having the upwardly extending handle 83' may be opened on occasion to permit the complete draining of the Oakite tank 69 when the solution becomes old or diluted and must be replaced with new solution.

An overflow opening 84 adjacent the top edge of the tank 69 leads into the overflow line 85 where it is carried down into the sewer through the line 86.

A screen 87 extending laterally and from the bottom to the top within the tank 69 is in fixed position as shown in Fig. 11, so as to withhold any foreign substance from entering the chemical pump 74 through the line 75 which draws the chemical solution to the pump through the point at X adjacent the lower corner of the said tank 69, see Figure 11.

Figure 4:
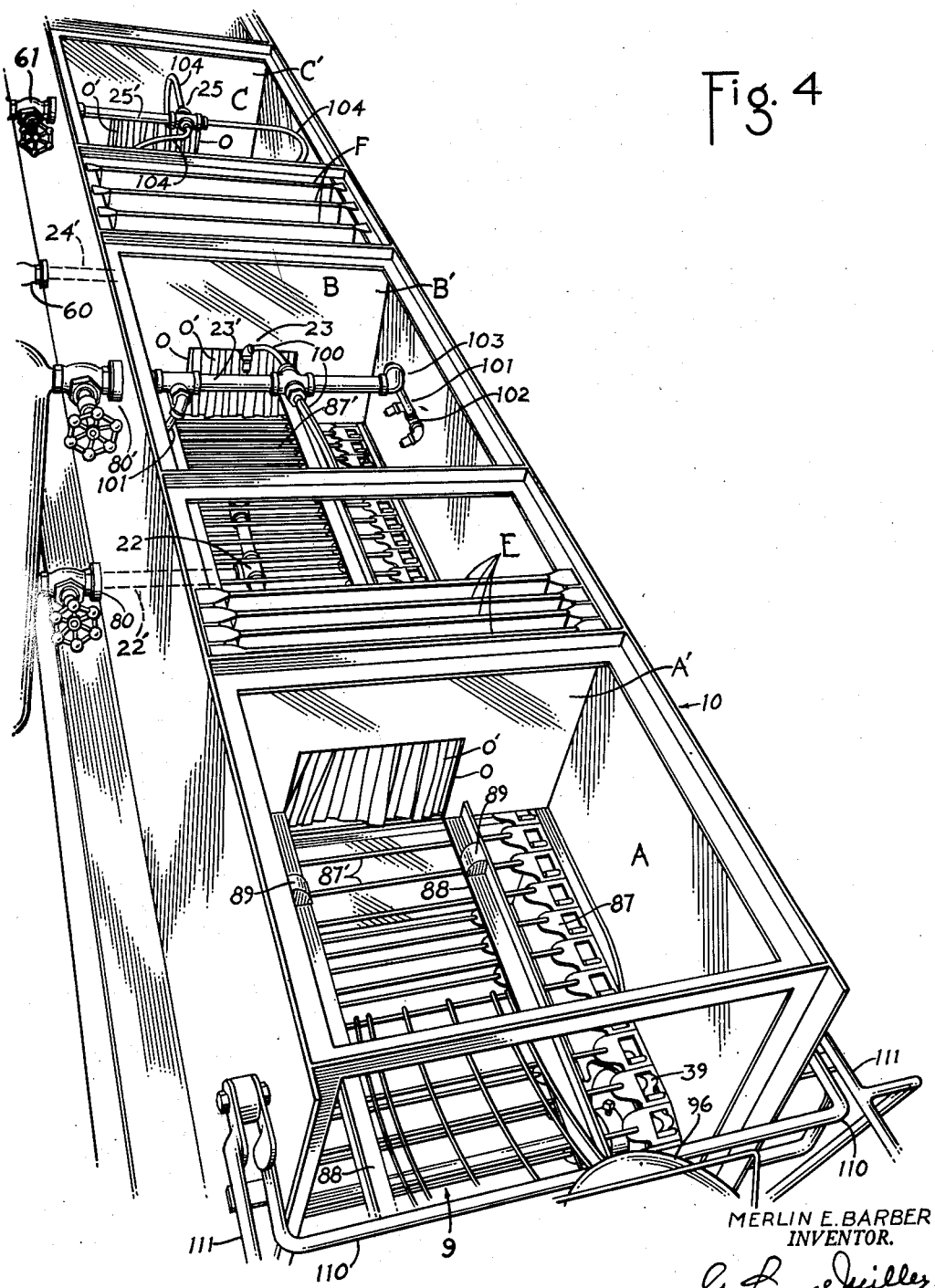
Figure 4 is a perspective view taken from the loading end and somewhat above the machine, showing particularly the conveyor means, the portions having openings curtained by strips of rubber, and showing some of the spray nozzles.

The conveyor belt 9 is comprised of the usual metal endless belt chain 87 having rectangular openings therein to engage the spurs of the spur gears 36—37 and 39—40 used in the device, and an endless or continuous series of laterally arranged bar members 87', see Figs. 4 and 10, supports and carries along through the machine a plurality of glass meter covers. A pair of longitudinally arranged angle iron track members 88 provide means for guiding said covers through the center (between the sides) of the cabinet 10. A pair of little rubber bumpers 89, see Figs. 3 and 4, are fixed opposite each other in the angle members 88, so as to guide the covers centrally into and out of the machine. The covers do not ride on the said track members 88, but move along between them and are guided thereby.

In the Figs. 10 and 11 no insulation is shown around the chemical tank 69, but it is normally insulated, and is so shown in the Figs. 1 and 2. Also, a cover is shown on said tank in the Figs. 1 and 2.

Fig. 12 is a fragmentary view showing partly in section and partly in elevation, the details of the structure at Y and Z in Fig. 2 in particular, although in said Fig. 2 these details are shown covered with a casing of insulating material. Now, in the top of the T fitting 90 shown in the Fig. 12, is shown a bushing 91 threadably engaged therein, and this bushing supports integrally and flush with its top face an elongated thimble-like member 92 known as a "thermometer well." This thermometer well 92 is adapted to receive a thermometer 93 of elongated capsule-like shape, this thermometer 93 being connected by means of a flexible cable-like member 94 to a temperature indicator unit 95 mounted on the wall or other suitable place, see Fig. 1. It is obvious that the hot water and the Oakite solution temperature may be gauged by this arrangement, because the thermometer well is in direct immersion therein and the temperatures are conveyed instantly and constantly to the thermometer.

The lower chemical spray nozzle assembly 22 is mounted on the inner end of the horizontally arranged feed pipe 22', see Fig. 4, centrally between the sides of the cabinet 10, see Figs. 4 and 10, and between the upper and lower courses of the conveyor element, see Fig. 11, for the purpose of directing a strong and heavy Oakite spray upward through the conveyor onto the inner surfaces of the glass covers 96 above.

The upper chemical spray nozzle assembly 23 is mounted on the inner end of the horizontally arranged feed pipe 23', see Figs. 4 and 11, and the tubes 100 are of soft copper to enable said tubes to be readily positioned by bending, thereby enabling the nozzles at the ends thereof to direct the sprays of stream where desired. While the short pipes 101 carrying the relatively short crossarms 102, which mount the spray nozzles, are swingably mounted on a double elbow arrangement 103 to enable the spray stream to be directed as desired. All of the nozzles in the invention may be of any suitable type to effect required results.

The lower hot water rinse spray nozzle assembly 24 is similar to the lower chemical spray nozzle assembly 22 and is mounted on a similar feed pipe 24'. This assembly is for the purpose of directing a strong hot water spray upwardly onto the inner surfaces of the glass covers above.

The spray nozzle assembly 25 is mounted on the inner end of the horizontally arranged feed pipe 25', see Figs. 4 and 10, and the tubes 104 are of soft copper like the tubes 100 and for the same reason. This assembly 25 directs the hot water spray onto the outside surfaces of the glass covers 96 passing beneath.

The initial step of loading the glass covers 96 by feeding them to the loading station A from a loading chute 97 onto the conveyor 9 in spaced relation is illustrated in Figures 5 through 9. Special means to accomplish the spaced apart feed of the covers is utilized and comprises a sleeve 105 from which are formed two curved angular cam fingers 106 and 107, see Figure 5. These fingers rotate as the conveyor sprocket shaft revolves with the sleeve 105 and consecutively engage with the hooked ends 108 and 109 of a pivoted cover starting or releasing member 110 and a pivoted cover stopping and spacing member 111.

As illustrated in Fig. 5 a cover 96 is held in stopped position, until the cam finger 106 actuates member 110 and releases the cover to the dotted line position shown in Fig. 6. The stop member 111 still holds the next cover back until the cam finger 107, which follows the cycle of cam finger 106 raises the member 111 and the next cover comes into position as in Figure 7.

OPERATION

The detailed operation of the present machine should be apparent from the foregoing description, but briefly summarizing the same, the covers 96 are fed to the part of the conveyor 9 in station A at spaced intervals from the chute 97. It is of course understood that the necessary switches 42 and 71 have been closed to start the conveyor and the pumps to the spray nozzles.

From the loading station A the covers are conveyed through opening O to station B and treated and sprayed with a chemical solution, such as Oakite from the tank 69 and on to the rinsing station C. At station C the spray nozzles 24 and 25 spray the covers 96 both inside and out with hot water from tank 44 and then proceed to the drier station D from which they are discharged thoroughly cleansed.

Below each station are the drain tanks which have drains to carry the chemical solution back to the chemical tank 69 and which carry the rinse water off to the sewer or waste line.

As explained in the description the valves and conduits are arranged to by-pass fluid to clean out the spray nozzles and to flush out the machine after extensive use.

Without further description it is believed that this invention is clearly understandable from the foregoing and while the apparatus has been specifically illustrated and described, it is to be expressly understood that other combinations and arrangements of parts may be used by others in practicing this invention without departing from the scope hereof. To determine the scope of this invention reference should be had to the appended claims.

What is claimed is:

1. Apparatus for treating articles by washing, rinsing and drying the same comprising a main washing and rinsing chamber, an endless conveyor having an upper course of skeleton form travelling the length of said chamber, an article loading chute for feeding the articles one at a time in spaced apart relation onto said conveyor, a chemical spray assembly arranged to spray the articles from both top and bottom as they are conveyed through the chamber, a chemical solution supply tank, a supply line there-from to said chemical spray assembly, a return line to said tank from the chamber, a pump for pumping the fluid to the spray assembly and a by-pass around the pump to return surplus chemical solutions to the suction side of the pump when the pump is operating and the spray assembly is not discharging.

2. Apparatus for washing electric meter covers and the like comprising a supporting structure, an elongated chamber on the upper part of the structure, a plurality of vertical spaced apart partitions with openings covered by flexible curtains therein transverse the chamber for the passage of the courses of a conveyor belt and articles thereon, each partition serving as an end wall for a loading cabinet, a washing cabinet, a rinsing cabinet and a drier cabinet, a drain tank below each of the said cabinets, a spray assembly mounted in the washing cabinet, a tank connected to said spray assembly by conduit means, an electrically driven pump for forcing fluid from the tank to the spray assembly, electric heating elements in said tank, an electric switch control for supplying electric current to drive said pump and energize said heating elements, a second spray assembly mounted in said rinsing cabinet, a water tank connected to said second spray assembly by conduit means, a second electrically driven pump for forcing water from the tank to the second spray assembly, electric heating elements in said water tank, a second electric switch control for supplying current to drive the second pump and to simultaneously energize the said heating elements, and thermostat means operatively associated with each of said electric switch controls adapted to cut out the heating elements in each tank at a predetermined temperature.

3. The apparatus described in claim 2, wherein each of said spray assemblies include tubes formed of bendable material, whereby the same may be bent to direct the spray in various directions against the covers being washed and rinsed.

4. The apparatus described in claim 2, wherein the openings in the said partitions are in line with a plurality of flexible sheets of material removed from said openings serving as baffles to prevent escape of fumes and steam from the washing and rinsing cabinets.

5. Apparatus for washing, rinsing and drying, glass covers for electric meters and the like comprising an elongated main chamber having a loading end and a discharge end, a plurality of centrally apertured partitions transverse the said chamber, loading, washing, rinsing and drying stations defined between the said partitions, flexible closures hanging over each of the partition apertures, and an endless conveyor having both of its flights travelling through said partition apertures and conveying the covers loaded thereon through the apertures from one of said stations to the other, said conveyor being an endless conveyor formed of transversely arranged spaced apart bars and elongated guide means extending along each side slightly above the edge of the upper course of the conveyor, said guides having rubber bumpers to prevent breakage of the glass covers being treated.

MERLIN E. BARBER.

References Cited in the file of this patent

UNITED STATES PATENTS

| Number | Name | Date |
| --- | --- | --- |
| 880,713 | Blair | Mar. 3, 1908 |
| 1,185,641 | Ellis | June 6, 1916 |
| 1,217,958 | Klahre | Mar. 6, 1917 |
| 1,314,041 | Blakeslee | Aug. 26, 1919 |
| 1,461,638 | Wells et al. | July 10, 1923 |
| 1,640,693 | Couch | Aug. 30, 1927 |
| 1,857,728 | Lindgren | May 10, 1932 |
| 2,017,677 | Webb | Oct. 15, 1935 |
| 2,142,902 | Kempton | Jan. 3, 1939 |
| 2,155,271 | Jones | Apr. 18, 1939 |
| 2,249,529 | Knights | July 15, 1941 |
| 2,250,238 | Smith | July 22, 1941 |
| 2,317,675 | Burgh | Apr. 27, 1943 |
| 2,399,205 | Campbell | Apr. 30, 1946 |
| 2,445,371 | Thurn | July 20, 1948 |